United States Patent [19]

Chawan et al.

[11] Patent Number: 5,759,607

[45] Date of Patent: Jun. 2, 1998

[54] USE OF PROPYLENE GLYCOL ALIGINATE TO IMPROVE THE TEXTURE OF COOKED PASTA AND PASTA-LIKE FOODS

[75] Inventors: Dhyaneshwar Bhujangarao Chawan, Liverpool; Carleton George Merritt, Phoenix; Edward Albert Matuszak, Liverpool, all of N.Y.

[73] Assignee: Borden Foods Corporation, Columbus, Ohio

[21] Appl. No.: 408,173

[22] Filed: Mar. 22, 1995

Related U.S. Application Data

[63] Continuation of Ser. No. 918,165, Jul. 21, 1992, abandoned, which is a continuation of Ser. No. 751,017, Aug. 28, 1991, abandoned.

[51] Int. Cl.$^6$ ........................................ A23L 1/16
[52] U.S. Cl. ............... 426/557; 426/451; 426/573; 426/575
[58] Field of Search .................. 426/451, 557, 426/573, 575

[56] References Cited

U.S. PATENT DOCUMENTS

| | | |
|---|---|---|
| 2,426,125 | 8/1947 | Steiner . |
| 3,332,786 | 7/1967 | Edlin . |
| 3,615,677 | 10/1971 | Scharschmidt ............... 426/557 |
| 3,992,554 | 11/1976 | Blake et al. ............... 426/557 |
| 4,185,125 | 1/1980 | Sakakibara et al. ....... 426/557 |
| 4,517,215 | 5/1985 | Hsu ............................ 426/451 |
| 4,544,563 | 10/1985 | Lechthaler ................. 426/557 |
| 4,575,460 | 3/1986 | Alapi et al. ............... 426/557 |
| 4,579,746 | 4/1986 | Hirose ...................... 426/557 |
| 4,675,199 | 6/1987 | Hsu .......................... 426/516 |
| 4,748,032 | 5/1988 | Kono et al. . |
| 4,844,936 | 7/1989 | Cox et al. ................ 426/523 |
| 4,876,104 | 10/1989 | McGuire et al. .......... 426/21 |
| 4,990,349 | 2/1991 | Chawan et al. ........... 426/557 |
| 5,030,462 | 7/1991 | Brimelow et al. . |

*Primary Examiner*—Lien Tran
*Attorney, Agent, or Firm*—Watson Cole Stevens Davis, P.L.L.C.

[57] ABSTRACT

A method is disclosed which uses propylene glycol alginate to improve the texture of food compositions. Pasta is provided which exhibits improved texture retention after refrigeration or freezing. In addition, the use of propylene glycol alginate allows the use of non-wheat flours, such as oat flour, corn flour, corn starch, pea flour, lima bean flour, soybean flour, and navy bean flour in the production of pasta-like foods.

5 Claims, No Drawings

USE OF PROPYLENE GLYCOL ALIGINATE TO IMPROVE THE TEXTURE OF COOKED PASTA AND PASTA-LIKE FOODS

This application is a Continuation of application Ser. No. 07/918,165, filed Jul. 21, 1992 now abandoned which in turn is a continuation application of Ser. No. 751,017, filed Aug. 28, 1991 (now abandoned).

FIELD OF THE INVENTION

The invention relates to the preparation of food compositions with improved texture and resistance to retrogradation of starch. More specifically, the invention relates to a method for improving the texture of pasta or pasta-like products by the incorporation into a dough of an additive, such as propylene glycol alginate. From this dough, pasta is produced which can be cooked and refrigerated or frozen without loss of texture.

BACKGROUND ART

The popularity of pasta as an inexpensive, convenient and nutritious food has rapidly increased. Both stove top and microwave preparations have been available, but conventional pasta products exhibit certain limitations. One significant limitation is the deterioration of texture of the cooked pasta, if refrigerated or frozen. Even cooked pasta with excellent texture when freshly made loses its texture quality if refrigerated or frozen. Conventional pasta when refrigerated or frozen becomes soft, mealy or pasty due to starch crystallization. This has an undesirable effect on, for example, pasta salads, leftover pasta, and frozen pasta meals.

U.S. Pat. No. 4,748,032, issued May 31, 1988 to Kono et al., teaches a method for preventing deterioration of a food, wherein an oligosaccharide originating from agar or carrageenan or both is added to the food. Kono et al. teaches that this addition prevents the retrogradation of gelatinized starch. Retrogradation of starch occurs when gelatinized alpha-starch, made by heating in the presence of water, undergoes hardening and forms beta-starch. As a result, palatability and texture of the foods deteriorate. The method of Kono et al. dissolves agar or carrageenan in water and involves heating and reacting an enzyme to effect enzymatic hydrolysis. Hydrolases for agar include agarase and those for carrageenans include carrageenase. In this manner, or by acid hydrolysis, Kono et al. produces oligosaccharide polymerized mixtures. If the degree of polymerization is from 2 to 20, an effect to prevent deterioration of foods can be obtained by using the oligosaccharide in the same manner as sugars, but in substitution therefor. The deterioration is inhibited by preventing starch retrogradation. Kono et al. teaches that sodium alginate can also be used to prevent deterioration due to starch retrogradation.

U.S. Pat. No. 3,332,786, issued Jul. 25, 1967 to Edlin, relates to the stabilization of starch against enzymatic degradation by the addition thereto of propylene glycol alginate. Edlin teaches the use of propylene glycol alginate to stabilize starch, including wheat starch, against degradation by amylase enzymes in an aqueous acid environment. A pH of 3.0 to 4.5 and preferably 3 to 4 is taught as useful for the stabilization. Improvement of pasta texture is not taught and, in fact, the process of Edlin only produces a paste, not an extrudable pasta. Edlin cooks a slurry of starch to fully gelatinize it in the presence of propylene glycol alginate.

U.S. Pat. No. 3,426,125, issued Aug. 19, 1947 to Steiner describes propylene glycol alginate.

BRIEF DESCRIPTION

The invention relates to the preparation of food compositions with improved texture and resistance to starch retrogradation. The invention further relates to a method for improving the texture of pasta products, pasta-like products, and baked goods by the incorporation of an additive such as propylene glycol alginate. Food products produced by adding propylene glycol alginate to a flour and water dough exhibit dramatic improvement in texture compared to analogous products produced without the addition of propylene glycol alginate, also referred to herein as "PGA".

Of particular significance, and an advantage of the present invention, is the improvement obtained in the texture of cooked pasta prepared by the present process, especially after the pasta has been refrigerated or frozen. Such pasta does not become unacceptably soft, mealy or pasty, unlike refrigerated or frozen conventional pasta which lacks propylene glycol alginate. This feature is of significant value to restaurants whereby excess cooked pasta can be saved and served later. Another commercial advantage of the present invention is the additional weight gain obtainable by prolonged soaking, producing higher yields without loss of quality.

The invention also relates to fried or dried food compositions prepared from a dough comprising starch flour, water and propylene glycol alginate.

DETAILED DESCRIPTION

In the preparation of pasta and pasta-like products in the present invention, a dough or alimentary paste is prepared by combining an ungelatinized starch flour, PGA and water. The preferred method is to hydrate the PGA first by combining, for example, 6 to 30 grams PGA in 1000 grams of water. A dough or alimentary paste comprising starch, PGA, and water results. If the starch is wheat flour, the dough may also contain added protein, fiber, etc. The dough or alimentary paste, usually 28 to 30% by weight moisture, is then formed to a desired shape by conventional techniques, such as, but not limited to, extrusion or sheeting to form, for example, noodles, spaghetti, elbow macaroni, ziti, fusilli, fettuccine, rigatoni, vermicelli, and the like. The formed pasta is then dried under standard drying conditions (e.g., 70° C.) to produce a shelf stable, dried pasta or pasta-like product.

The present invention is also directed to food compositions comprising flour and PGA which might not be pasta or pasta-like. Thus, for example, products made from a PGA/flour dough which are baked or fried are also obtained by the present invention.

According to the present invention, propylene glycol alginate is added to the ungelatinized starch and water to form a dough or alimentary paste, preferably before the dough or alimentary paste is formed into a shape. The hydrated propylene glycol alginate is added to the ungelatinized starch or flour as a solid, or preferably as an aqueous solution, at a level of from about 0.01 to about 2.0% PGA by weight. A preferred level of propylene glycol alginate in the dough is about 0.3% by weight. The pH of the dough is not a limitation herein and can be, for example, from about 6.0 to about 7.0. A preferred pH is about 6.5. The alginate is believed to form a stable complex with starch which inhibits rupture in the dough when gelatinized which reduces starch loss on subsequent cooking. Also, the propylene glycol alginate prevents non-enzymatic retrogradation of the starch under various conditions of storage by inhibiting amylose from being freed or released from the starch granules.

The use herein of the term "pasta" shall also include pasta-like food products which may have the appearance of pasta, but which do not meet the accepted standard of identity for a pasta, due to, for example, the presence or absence of one or more ingredients. Thus, for example, corn pasta can be prepared by the present invention by incorporating PGA into corn flour and water. Therefore, by the present invention "pasta" includes non-wheat food products, oat flour products, semolina-based food products, durum wheat food products, corn starch, and wheat starch food products containing PGA. Legumes can also be used as the source of starch flour. Thus, for example, and not by limitation pea flour, lima bean flour, navy bean flour, soybean flour, and the like, or mixtures thereof can also be used with PGA according to the present invention. This is a surprising and important feature of the present invention. Dough cannot be extruded from combinations of pea or bean flour and water without PGA. However, by the present invention, such combinations are produced. The food compositions resulting from the use of legume flour, water and PGA possess significantly higher levels of lysine and other amino acids which allow the production of protein-enriched pasta products. In addition, many consumers cannot tolerate wheat products due to wheat protein sensitivities or allergies. The present invention provides pasta-like products derived from legumes and other non-wheat flour sources.

The pasta can be cooked by conventional methods of stove top boiling in excess water, stove top boiling in exact amount of water (i.e. no-drain cooking, wherein the pasta absorbs all the boiling water), or microwave cooking.

A cooked pasta prepared from dough made with propylene glycol alginate has a texture which is stable for extended periods up to about 30 days at refrigerator conditions (40° F.) and indefinitely when frozen (0° F.).

Conventional pasta made without the addition of propylene glycol alginate does not exhibit the significant improvement of the instant invention, particularly after the pasta is refrigerated or frozen. More importantly, ungelatinized extruded pasta or pasta-like products cannot be made from non-glutinous cereal, such as wheat starch or corn starch, in the absence of PGA.

Thus in one embodiment of the present invention, pasta is prepared from ungelatinized semolina or durum wheat flour and water, with the addition of about 2% by weight propylene glycol alginate. A preferred embodiment combines semolina, water, and 0.3% by weight PGA. These ingredients and optionally whole eggs, egg whites, triethyl citrate and other additives, are mixed to form a dough or alimentary paste which is shaped and dried.

Conventionally, sodium diphosphate is added to pasta dough to accelerate the cook time. However, by the present invention, sodium diphosphate is not needed for improved cooking time.

The PGA can be dry blended with the semolina, durum flour, corn starch, oat flour, pea flour, lima or soy bean flour, navy bean flour or wheat starch, or preferably the PGA is first hydrated by mixing 6 to 30 grams of PGA in 1000 grams of water.

At levels of 1% by weight in the pasta, PGA allows pasta to cook for periods up to 18 minutes without degradation of flavor or texture. The longer cooking times are desirable for the food service industry because higher yields are produced; the pasta further hydrates and swells. Levels of PGA about 1% by weight in the pasta produce less water pickup for comparable cooking time, but higher levels of PGA will guard against overcooking. Such cooking tolerance is an unexpected and commercially significant advantage of the present invention.

The present invention is illustrated in the following examples, but it should be understood that the present invention is not limited thereto.

SAMPLE #645

Monosodium phosphate (60 grams) and disodium phosphate (60 grams) were dissolved in water (1086 grams). Propylene glycol alginate (60 grams) obtained from Kelco, Division of Merck & Co., Inc., was dispersed in the water and this mixture added to durum wheat flour (6000 grams) obtained from ConAgra containing 15.8% inherent moisture. The mixture was mixed in a Hobart cutter/mixer to form a dough which was then extruded to produce thin wall small elbow macaroni. Lengths were cut and the elbows were dried in a Standard Industries pasta dryer at 70° C. for six hours.

SAMPLE #650

Monosodium phosphate (60 grams) and disodium phosphate (72 grams) were dissolved in water (1011 grams). Propylene glycol alginate (30 grams), obtained from Kelco, Division of Merck & Co., Inc., was dispersed in the water and this mixture added to durum wheat flour (6000 grams) obtained from Con Agra, containing 16% inherent moisture. The mixture was mixed in a Hobart cutter/mixer to form a dough which was then extruded to produce thin wall small elbow macaroni. Lengths were cut and the elbows were dried in a Standard Industries pasta dryer at 70° C. for six hours. The pasta produced has one half the amount of propylene glycol alginate present in the pasta from Sample #645.

SAMPLE #665

Propylene glycol alginate (15 grams) was dispersed in 1005 grams water, and mixed with 6000 grams of durum flour in a Hobart cutter mixer to form a dough. The dough was extruded, cut and dried as in Sample #645.

SAMPLE #652

Pasta was prepared as in Sample #665, except water (1023 grams) was added to the dry blend of propylene glycol alginate and durum flour (6000 grams) (the flour had 16% inherent moisture). The water contained monosodium phosphate (60 grams) and disodium phosphate (60 grams). The resulting dough was formed into pasta as in Sample #645 and dried.

SAMPLE #653

Durum flour (4761.9 grams) (16% inherent moisture) and soy fiber (989.6 grams) (4% inherent moisture) obtained from ConAgra, were blended in a Hobart cutter/mixer. Potassium metabisulfite (3.3 grams) was dissolved in water (1553.9 grams) and propylene glycol alginate (50 grams) was dispersed in the water with a wire whisk. This was then added to the flour-fiber mixture in the mixer. Mixing was continued to form a dough which was formed into pasta as in Sample #645.

The pasta prepared in the above samples were cooked by stove-top cooking in excess water for 12 minutes. The cooked pastas were evaluated immediately for texture and compared to a control sample prepared by mixing durum flour (6000 grams) and water (1000 grams) without PGA. The inventive samples met or exceeded the texture of the control sample.

Cooking losses, yield, and texture were evaluated as functions of PGA content in several pastas prepared by the following examples. Cooking losses and texture evaluation were performed by the procedures described below.

COOKING LOSSES AND TEXTURE EVALUATION BY ONE STEP STOVE TOP METHOD ("No Drain")

1. Place 500 g distilled water in 4-quart sauce pan and bring to boil.
2. Weight 170 g pasta and add to boiling water.
3. Stir and start timer.
4. Cook time 8 minutes.
5. Stir at 2, 4, 5, 6, 7, & 7½ minutes.
6. Remove from heat source.
7. Add 500 g distilled water to pot and stir for 15 seconds.
8. Let stand 10 seconds, stir again quickly and drain using a tared colander. Collect drain water. Stir pasta in colander 10 seconds to release water in cooked pasta.
9. Let cooked pasta drain 1 minute.
10. Determine % water pick up and solids loss in the drain water.

Calculations $$A. \text{ \% Cooking Losses} = \frac{\text{\% Solids in Drain Water} \times \text{Drain Water Weight (gm)}}{170 \text{ gms (Weight of Uncooked Pasta)}}$$

$$B. \text{ \% Weight Gain} = \frac{(\text{Weight of Cooked Pasta gms}) - 170 \text{ gms}) \times 100}{170 \text{ gms (Weight of Uncooked Pasta)}}$$

C. Texture - Evaluate the cooked pasta as rinsed and drained from the colander for texture (subjective test by trained person). Texture was also determined objectively using Instron measurements (Tables 4 and 5).
Grade as follows:

| | | |
|---|---|---|
| Accept | 5 | Excellent (aldente) |
| Accept | 4 | Very Good - firm, not sticky/pasty |
| Accept | 3 | Good - moderately firm |
| Reject | 2 | Poor - soft, mushy, pasty, etc. |
| Reject | 1 | Very Poor - sticky, pasty, gummy, etc. |

COOKING LOSSES BY MICROWAVE COOKING

1. Weigh 100 gms of pasta (small elbows) into a 2.5 liter saucepan.
2. Add 350 gms of distilled water at room temperature (70° F.) and stir well (5 seconds).
3. Microwave (650 watts)* at HIGH (setting) for 5 minutes.
4. Stir well with a spoon or fork (5 seconds).
5. Microwave again for 5 minutes at the same setting.
6. Stir well; add approximately 500 gms distilled water at 140° F. plus or minus 10° F. Stir well again (10 seconds), and drain through a tared colander collecting the drain water.
7. Mix or stir pasta in colander (10 seconds) so that any water trapped in cooked pasta is released.
8. Let drain for 1 minute.
9. Weigh the drain water and determine the percent solids.
10. Weigh the pasta in the colander.

Calculations $$A. \text{ \% Cooking Losses} = \frac{\text{\% Solids in Drain Water} \times \text{Drain Water Weight (gm)}}{100 \text{ gms (Weight of Uncooked Pasta)}}$$

$$B. \text{ \% Weight Gain} = \frac{(\text{Weight of Cooked Pasta (gms)} - 100 \text{ gms}) \times 100}{100 \text{ gms (Weight of Uncooked Pasta)}}$$

COOKING LOSSES IN PASTA STOVE TOP

EQUIPMENT

1. Gas stove with four same-size burners.
2. Four—4 quart sauce pans (same make and dimensions).
3. Four colanders (same make and size).
4. Timer.
5. Four same-size pans to hold the colanders, for collecting the drain water.
6. Sample bottles.

PROCEDURE

1. Weigh 1500 grams distilled water into each of the 4 quart sauce pans.
2. Heat the water in the sauce pans. Start all the gas burners and adjust to the "HIGH" setting.
3. Let the water come to a boil and wait for 15 seconds.
4. Add 50 grams of pasta to each sauce pan as quickly as possible and mix the contents to break any lumping.
5. Wait for 15 seconds so that all the contents come to a boil.
6. Start the 12 minute timer.
7. At the end of 12 minutes, drain the cooked pasta from each sauce pan through the colanders as quickly as possible. Wait for 1 minute. Stir pasta with ladle for 15 seconds so that any trapped water in pasta is dislodged and drained out.
8. Weigh the cooked pasta and drain water.
9. Transfer the drain water into sample bottle and submit for Total Solids determination.

CALCULATIONS $$1. \text{ \% Weight Gain of Cooked Pasta} = \frac{(\text{Weight of cooked pasta} - 50) \times 100}{50}$$

$$2. \text{ \% Cooking Loss} = \frac{\text{\% Total Solids in Drain Water} \times \text{Weight of Drain Water}}{50}$$

Table 1 illustrates the evaluation of the pastas. In addition, data are presented on cooking variations (Table 2), nonglutinous cereals and starches (Table 3), pasta salad texture after refrigeration (Table 4), high yields by longer cooking time without texture loss (Table 5).

TABLE 1

EFFECT OF PROPYLENE GLYCOL ALGINATE (PGA) ADDITION ON PASTA QUALITY

| PRODUCT | SAMPLE | DOUGH MOISTURE % | PGA[1] wgt. % | COOKING LOSS % | YIELD % | TEXTURE[2] |
|---|---|---|---|---|---|---|
| Elbows | 649 | 28 | None (Control) | 8.96 | 231 | 3.0 |
| Elbows | 661 | 30 | 0.5 PGA Hydrated | 7.32 | 242 | 4.0 |
| Elbows | 665 | 28 | 0.25 PGA Hydrated | 7.89 | 246 | 4.0 |
| Elbows | 652 | 28 | 1.0 PGA Dry Blended | 8.97 | 267 | 3.5 |
| Elbows | 664 | 28 | 0.1 PGA Hydrated | 8.00 | 246 | 3.5 |
| Elbows - high fiber content 19% by weight | | | | | | |
| | 657 | 32 | 1.0 PGA Hydrated | 7.96 | 217 | 3.5 |
| Spaghetti | 654 | 28 | 0.5 PGA Hydrated | 6.45 | 178 | 4.5 |
| Spaghetti | 542 | 28 | None | 7.46 | 151 | 3.5 |
| Whole Wheat Spaghetti | 658 | 32 | 0.5 PGA Hydrated | 8.58 | 194 | 3.5 |
| Whole Wheat Spaghetti | 577-B | 30 | None | 8.14 | 167 | 3.0 |
| Fiberoni Spaghetti Control | 659 | 32 | None | 10.04 | 175 | 2.0 |
| Test | 660 | 32 | 1.0 PGA Hydrated | 6.82 | 171 | 4.0 |

[1] PGA = weight of propylene glycol alginate divided by weight of flour × 100.
[2] A subjective test by five experienced pasta evaluations in which 5 = Excellent; 4 = Very Good; 3 = Good; 2 = Poor; 1 = Very Poor

TABLE 2

COOKING VARIATIONS

| PRODUCT | SAMPLE | DOUGH MOISTURE % | PGA wgt. % | COOKING LOSS % | YIELD % | TEXTURE* |
|---|---|---|---|---|---|---|
| Elbows | 661 | 30 | 0.5 PGA Hydrated | | | |
| Conventional-Drain Step - 12 min | | | | 7.32 | 242 | 4.0 |
| (No drain) Stove Top One Step Cook - 8 min | | | | 3.49 | 172 | 4.0 |
| Microwave Cooking - 10 min | | | | 4.15 | 178 | 4.0 |
| Elbows | 664 | 28 | 0.1 PGA Hydrated | | | |
| Conventional-Drain Step - 12 min | | | | 8.00 | 246 | 3.5 |
| Stove Top One Step Cook - 8 min | | | | 3.34 | 178 | 3.5 |
| Microwave Cooking - 10 min | | | | 4.25 | 184 | 3.5 |
| Elbows | 671 | 28 | 0.5 PGA Hydrated 1% DI SOD. Phosphate (for high yield) | 9.19 | 274 | 3.5 |

*5 = Excellent; 4 = Very Good; 3 = Good; 2 = Poor; 1 = Very Poor

TABLE 4

INSTRON TEXTURE - PASTA SALADS

| Number and Cook Time (minutes) | Yield | Instron[1] (Kg-50 gm) 10-days (Refrigerated) | |
|---|---|---|---|
| Stove Top plus drain | % | Peak-1 | Peak-2 |
| Creamette 7-minutes | 289 | 2.50 | 1.60 |
| 649-SO₂ Flour 9-minutes | 303 | 2.55 | 1.65 |
| 650-0.5% PGA 9-minutes | 323 | 4.30 | None |
| 651-1.0% PGA 9-minutes | 318 | 4.68 | None |
| 651-1.0% PGA 15-minutes | 379 | 3.30 | None |
| 665-0.25% PGA 14-minutes | 367 | 2.40 | None |

[1]Shear/Compression test was run on pasta after salad dressing was applied and product was stored for 10 days at 40° F. Generally, increased Instron values are preferred. As shown in Table 4, addition of PGA increased both the % yield and, with the exception of 0.25% PGA, the Instron texture measurement.

TABLE 5

INSTRON TEXTURE: EFFECT OF ALGINATE ADDITION ON TEXTURE OF PASTA COMPARED TO CONTROL (CREAMETTE)

| Number and Cook Time | Yield % | Instron Number Peak-1 (average of duplicates) Kg/50 grams Sample | Peak-2 | Texture* |
|---|---|---|---|---|
| Creamette (control) | | | | |
| 7-minutes | 284 | 8.75 | 6.30● | 3.0 |
| 8-minutes | 302 | 6.75 | 5.15● | 3.0 |
| 10-minutes | 330 | 5.90 | 4.00● | 3.0 |
| 12-minutes | 356 | 4.85 | 2.65● | 2.5 |
| 0.1% PGA | | | | |
| 664 7-minutes | 287 | 9.00 | None** | 5.0 |
| 664 8-minutes | 300 | 8.15 | None | 4.0 |
| 664 10-minutes | 322 | 6.40 | None | 4.0 |
| 664 12-minutes | 331 | 6.15 | None | 4.0 |
| 664 14-minutes | 357 | 5.40 | None | 4.0 |
| 664 16-minutes | 379 | 4.95 | None | 3.5 |
| 664 18-minutes | 397 | 4.43 | None | 3.5 |
| 0.25% PGA | | | | |
| 665 7-minutes | 289 | 9.80 | None | Too Chewy |
| 665 8-minutes | 297 | 8.80 | None | 5.0 |
| 665 10-minutes | 329 | 7.15 | None | 5.0 |
| 665 12-minutes | 344 | 6.65 | None | 5.0 |
| 665 14-minutes | 364 | 6.15 | None | 5.0 |
| 665 16-minutes | 391 | 5.05 | None | 4.0 |
| 665 18-minutes | 397 | 4.40 | None | 4.0 |

PGA = Propylene Glycol Alginate
Number = Kramer shear cell was used with 50 KG compression cell
*5 = Excellent; 4 = Very Good; 3 = Good; 2 = Poor; 1 = Very Poor
● Evidence of gumminess or pastiness as noted in chewing
**Less gummy or pasty
Generally, increased Instron values are preferred.

As shown in the tables, pastas prepared with propylene glycol alginate had texture scores better than the texture score for the control pastas prepared without propylene glycol alginate.

It has also been discovered that, by the present invention, food compositions are prepared which can readily be retorted including, for example, canned pasta meals. Thus, dough products utilizing SO₂-treated wheat flour, water, with or without triethyl citrate and egg whites, and propylene glycol alginate were prepared and extruded, cut and dried to yield excellent pasta. Sample 680 exhibited excellent texture (rated 5) as fresh-made and good (rated 3.5) after retorting 21 minutes at 252° F. in tomato sauce. The control samples 678 and 679 exhibited lower yields and lower texture evaluations.

Sample #679 control

SO₂-treated flour (5040 solids), water (428 grams) and egg whites (916 grams) containing triethyl citrate were mixed, extruded, cut to form elbow macaroni, and dried.

Sample #680

SO₂-treated flour (5040 solids), water (287 grams), egg whites (120 grams) containing triethyl citrate, and propylene glycol alginate 18 grams (available as Kelcoloid-LVF, from Kelco, Division of Merck & Co., Inc.) were mixed, extruded as straight macaroni, cut and dried.

Sample #678 Control

SO₂-treated flour (5040 solids) and water (1200 grams) were mixed, extruded as thick wall straight macaroni, cut and dried.

The samples 678, 679 and 680 were cooked (stove-top, 12 minutes) and tested for % yield, % cooking loss and texture (Table 6).

TABLE 6

| Sample # | Yield, % | Cooking Loss, % | Texture |
|---|---|---|---|
| 678 | 145 | 6.25 | 3 |
| 679 | 142 | 5.55 | 4 |
| 680 | 149 | 5.29 | 5 |

The product from samples 678, 679 and 680 were tested for retorting or canning by cooking at 252° F. for 21 minutes in tomato sauce followed by subjective texture evaluations. Table 7 shows that the inventive sample 680 surpassed the control samples.

TABLE 7

| Sample # | Texture |
|---|---|
| 678 | 2.0 |
| 679 | 3.0 |
| 680 | 3.5 |

That which is claimed is:

1. A method for reducing the amount of non-enzymatic retrogradation of the starch in a cooked wheat flour dough, which method comprises incorporating into the dough an effective amount of propylene glycol alginate, whereby the amount of non-enzymatic retrogradation of the cooked dough is reduced relative to the amount of non-enzymatic retrogradation occurring in the dough in the absence of propylene glycol alginate and the texture of the cooked dough is stable for extended periods at refrigerator conditions and frozen conditions relative to the texture of pasta prepared in the absence of propylene glycol alginate.

2. A method for the inhibition of amylose release from the starch granules in a cooked wheat flour dough, which method comprises incorporating into the dough an amount of propylene glycol alginate sufficient to inhibit the release of amylose from the starch granules of the cooked wheat flour dough and the texture of the cooked dough is stable for extended periods at refrigerator conditions and frozen conditions relative to the texture of pasta prepared in the absence of propylene glycol alginate.

3. The method according to claim 2 wherein the wheat flour is selected from the group consisting of semolina and durum flour.

4. A method of increasing the yield in weight percent of pasta after being cooked in boiling water, said method consisting of (a) preparing a pasta dough consisting of wheat flour, water and from 0.01 to about 1.0 weight percent propylene glycol alginate;

(b) shaping and drying said dough to form a pasta; and (c) cooking said pasta by placing in boiling water for a time sufficient to increase the percent weight gain due to hydration beyond the percent weight gain achieved by pasta without propylene glycol alginate cooked in boiling water, and whereby the yield of pasta prepared with propylene glycol alginate and the texture of the cooked pasta is stable for extended periods at refrigerator conditions and frozen conditions relative to the texture of pasta prepared in the absence of propylene glycol alginate.

5. The method according to claim 4 wherein said propylene glycol alginate is present in an amount of 0.3 weight percent.

* * * * *